(12) United States Patent
Jeon et al.

(10) Patent No.: US 11,930,236 B2
(45) Date of Patent: Mar. 12, 2024

(54) CONTENT PLAYBACK DEVICE USING VOICE ASSISTANT SERVICE AND OPERATION METHOD THEREOF

(71) Applicant: Samsung Electronics Co., Ltd., Suwon-si (KR)

(72) Inventors: Byungjeong Jeon, Suwon-si (KR); Jina Kwon, Suwon-si (KR); Yuri Min, Suwon-si (KR); Hansol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 17/388,693

(22) Filed: Jul. 29, 2021

(65) Prior Publication Data

US 2021/0360312 A1    Nov. 18, 2021

Related U.S. Application Data

(63) Continuation of application No. PCT/KR2019/015865, filed on Nov. 19, 2019.

(30) Foreign Application Priority Data

Jan. 29, 2019    (KR) .................. 10-2019-0011315

(51) Int. Cl.
*G10L 15/22*    (2006.01)
*H04N 21/422*    (2011.01)
*H04N 21/482*    (2011.01)

(52) U.S. Cl.
CPC ....... *H04N 21/42203* (2013.01); *G10L 15/22* (2013.01); *H04N 21/42222* (2013.01); *H04N 21/4821* (2013.01); *G10L 2015/223* (2013.01)

(58) Field of Classification Search
CPC ....... H04N 21/42203; H04N 21/42222; H04N 21/4821; G10L 15/22; G10L 2015/223; G06F 3/167
(Continued)

(56) References Cited

U.S. PATENT DOCUMENTS 9,002,714 B2 *    4/2015    Kim .................... G06F 3/04895
                                                                704/275
9,733,895 B2 *    8/2017    Kim ........................ G06F 3/017
(Continued)

FOREIGN PATENT DOCUMENTS

KR    10-2017-0093491 A    8/2017
KR    10-2018-0038027 A    4/2018
(Continued)

OTHER PUBLICATIONS

International Search Report and Written Opinion of the International Searching Authority dated Mar. 2, 2020 from International Application No. PCT/KR2019/015865.
(Continued)

*Primary Examiner* — Susan I McFadden
(74) *Attorney, Agent, or Firm* — STAAS & HALSEY LLP

(57) ABSTRACT

A content reproduction apparatus includes an outputter configured to output audio and video, a user interface configured to receive an utterance input from a user, a memory storing one or more instructions, and a processor configured to execute the one or more instructions stored in the memory. The processor is configured to control the outputter to output a first screen in which one or more objects selectable by the user's utterance are included and a focus is displayed with respect to one of the one or more objects, and, to control the outputter to output utterable guide information for a next selection according to the
(Continued)

object corresponding to the focus displayed, when the user does not provide an utterance through the user interface.

15 Claims, 11 Drawing Sheets

(58) Field of Classification Search
USPC .......................................................... 704/275
See application file for complete search history.

(56) References Cited

U.S. PATENT DOCUMENTS

| | | | |
|---|---|---|---|
| 10,203,866 B2 * | 2/2019 | Karunamuni | ....... G06F 3/04842 |
| 10,269,347 B2 | 4/2019 | Jang et al. | |
| 10,956,022 B2 * | 3/2021 | Karunamuni | ....... G06F 3/04845 |
| 11,036,387 B2 * | 6/2021 | Karunamuni | ......... G06F 3/0482 |
| 2017/0286049 A1 | 10/2017 | Kim et al. | |
| 2018/0190289 A1 | 7/2018 | Subhojit et al. | |
| 2021/0165826 A1 | 6/2021 | Graham et al. | |
| 2021/0191968 A1 | 6/2021 | Orr et al. | |

FOREIGN PATENT DOCUMENTS

| | | |
|---|---|---|
| KR | 10-2018-0135884 A | 12/2018 |
| WO | 2016/032021 A1 | 3/2016 |
| WO | 2017/213684 A1 | 12/2017 |

OTHER PUBLICATIONS

Korean Office Action issued in counterpart Korean Application No. 10-2019-0011315 dated Nov. 7, 2023.

* cited by examiner

CONTENT PLAYBACK DEVICE USING VOICE ASSISTANT SERVICE AND OPERATION METHOD THEREOF

CROSS-REFERENCE TO RELATED APPLICATION

This application is a Continuation of International Patent Application No. PCT/KR2019/015865, filed on Nov. 19, 2019, which claims the priority benefit of Korean Patent Application No. 10-2019-0011315, filed on Jan. 29, 2019, in the Korean Patent and Trademark Office, the disclosures of which are hereby incorporated by reference in their entirety.

BACKGROUND

Field

Various disclosed embodiments relate to a content reproduction apparatus using a voice assistant service, and an operating method thereof, and more particularly, to a method and apparatus for providing, to a user, utterable guide information for selecting an object when the user does not select any object included in a screen by utterance after the screen is output.

Description of the Related Art

A user may use desired content by using various content reproduction apparatuses such as a television (TV), a personal computer (PC), a tablet PC, a mobile phone, etc. For this purpose, the user needs to select an object such as desired content on a screen output from a content reproduction apparatus. However, the user may be hesitant about what object to select or may not know how to select an object. In this case, because the user does not select any object, the content reproduction apparatus continuously displays the currently output screen as it is, or returns to a screen before the currently output screen and displays a previous screen.

A content reproduction apparatus according to an embodiment includes: an outputter including a display and an audio outputter; a user interface configured to receive an utterance input from a user; a memory storing one or more instructions; and a processor configured to execute the one or more instructions stored in the memory, wherein the processor is configured to control the display to output a first screen in which one or more objects selectable by the user's utterance are included and a focus is placed on one of the one or more objects, and, when an utterance for selecting one of the one or more objects included in the first screen is not received from the user through the user interface, control the outputter to output utterable guide information for a next selection according to the object on which the focus is placed.

SUMMARY

According to an embodiment, the case where an utterance for selecting one of one or more objects is not received may include a case where an utterance for selecting one of the one or more objects is not received from a user for a certain time after a first screen is output.

According to an embodiment, the case where the utterance for selecting one of the one or more objects is not received may include a case where additional information for selecting an object is requested by the user through a user interface.

According to an embodiment, an utterance input start signal may be received from the user through the user interface, and the case where the utterance for selecting one of the one or more objects is not received may include a case where an utterance for selecting one of the one or more objects is not received from the user after the utterance input start signal is received.

According to an embodiment, the case where the utterance for selecting one of the one or more objects is not received from the user after the utterance input start signal is received may include a case where, in a state in which the utterance for selecting one of the one or more objects is not received after the utterance input start signal is received, an utterance input end signal is received from the user through the user interface.

According to an embodiment, the user interface may be configured to further receive a control command of the user from a control device, the utterance input start signal may be a long-pressed input for a particular key provided in the control device, and the utterance input end signal may be a release of the long-pressed input. According to an embodiment, an audio outputter may be configured to output utterable guide information in a form of utterance, a display may be configured to overlay and display a screen indicating the utterable guide information over the first screen, and a processor may be configured to control the outputter to cause one or more of the audio outputter and the display to output the utterable guide information.

According to an embodiment, the utterable guide information may include utterance word information used to select the one or more objects by utterance.

According to an embodiment, the utterable guide information may further include information indicating that the utterance word information is an utterance command that the user is able to utter and give a control command.

According to an embodiment, the utterable guide information may include information for selecting one or more of screen movement and volume control.

According to an embodiment, the utterable guide information may include one or more of information for selecting the one or more objects and descriptive information about the one or more objects.

According to an embodiment, the processor may be further configured to cause the outputter to output utterable guide information including one or more of common information about a plurality of pieces of content and an information list about each content included in the plurality of pieces of content, and output the plurality of pieces of content in a spread-out manner.

According to an embodiment, the utterable guide information may include one or more of descriptive information about the first screen and request information for requesting other information.

A content reproduction method according to an embodiment includes: outputting a first screen in which one or more objects selectable by a user's utterance are included and a focus is located on one of the one or more objects; and when an utterance for selecting one of the one or more objects included in the first screen is not received from the user, outputting utterable guide information for a next selection according to the object on which the focus is located.

A computer-readable recording medium according to an embodiment has recorded thereon a program for executing a content reproduction method including: outputting a first screen in which one or more objects selectable by a user's utterance are included and a focus is located on one of the one or more objects; and when an utterance for selecting one of the one or more objects included in the first screen is not received from the user, outputting utterable guide information for a next selection according to the object on which the focus is located.

Embodiments of the disclosure will now be described more fully hereinafter with reference to the accompanying drawings so that they may be easily implemented by those of ordinary skill in the art. However, embodiments of the disclosure may have different forms and should not be construed as being limited to the embodiments set forth herein.

Terms used in the disclosure are general terms currently widely used in the art based on functions described in the disclosure, but may have different meanings according to an intention of one of ordinary skill in the art, precedent cases, or advent of new technologies. Thus, the terms used herein should be construed not based on simple appellations thereof but based on the meaning of the terms together with the overall description of the disclosure.

In addition, the terms used herein are only used to describe particular embodiments of the disclosure, and are not intended to limit the disclosure.

Throughout the specification, when a component is referred to as being "connected" or "coupled" to another component, it may be directly connected or coupled to the other component, or may be electrically connected or coupled to the other component with intervening components interposed therebetween.

The use of the terms "the" and similar referents in the context of describing the disclosure, especially in the context of the following claims, are to be construed to cover both the singular and the plural. Also, the operations of all methods described herein may be performed in any suitable order unless otherwise indicated herein or otherwise clearly contradicted by context. The embodiments of the disclosure are not limited to the described order of the operations.

Thus, the expression "in an embodiment" used in the entire disclosure does not necessarily indicate the same embodiment.

Some embodiments of the disclosure may be described in terms of functional block components and various processing operations. Some or all of such functional blocks may be implemented by any number of hardware and/or software components that perform specific functions. For example, functional blocks according to the disclosure may be realized by one or more microprocessors or by circuit components for a certain function. Furthermore, functional blocks according to the disclosure may be implemented with any programming or scripting language. The functional blocks may be implemented using various algorithms executed on one or more processors. Furthermore, the disclosure may employ techniques of the related art for electronics configuration, signal processing and/or data processing. The terms "mechanism", "component", "means", and "configuration" are used broadly and are not limited to mechanical or physical configurations.

Furthermore, connecting lines or connectors shown in various figures are intended to represent exemplary functional relationships and/or physical or logical couplings between components in the figures. In an actual apparatus, connections between components may be represented by alternative or additional functional relationships, physical connections, or logical connections.

The terms "unit", "-er (-or)", and "module" when used in this specification refers to a unit in which at least one function or operation is performed, and may be implemented as hardware, software, or a combination of hardware and software.

BRIEF DESCRIPTION OF DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
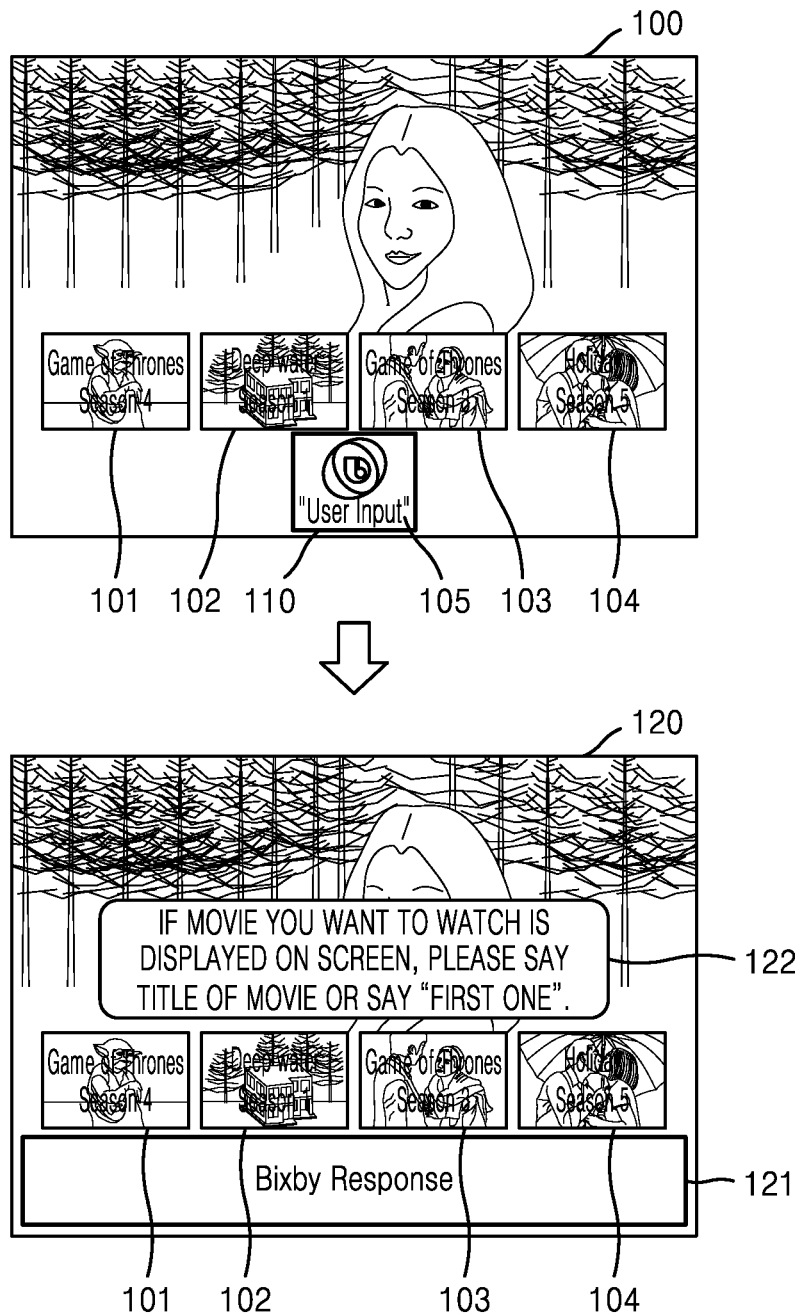
FIG. 1 is a diagram of a case where a content reproduction apparatus provides guide information to a user, according to an embodiment.

FIG. 1 is a diagram of a case where a content reproduction apparatus provides guide information to a user, according to an embodiment.

In FIG. 1, the content reproduction apparatus may be a reproduction apparatus using a voice assistant service. The content reproduction apparatus (not shown) may be an electronic device including a display, such as a television (TV), a personal computer (PC), a tablet PC, or a mobile phone. The content reproduction apparatus may output a first screen 100 through a display. The first screen 100 may be a result screen output according to a control command of a user. For example, the user may give a control command to the electronic device to output the first screen 100. The control command may include a user's utterance, and in addition to the utterance, the control command may include an image of the user or an optical signal through a control device (not shown) such as a remote controller or the like. The content reproduction apparatus may output a result thereof on the first screen 100 according to the control command from the user. Alternatively, the first screen 100 may be a screen that is automatically output when the content reproduction apparatus is turned on.

The first screen 100 may include one or more objects that the user may select by utterance. The object may refer to an item that is included and output on the screen and may be selected by a user's utterance. For example, the object may be content such as a movie or a soap opera. The object may be a single piece of content or a group of a plurality of pieces of content.

The object may be a function key selected to perform a particular function. For example, the object may be a movement button for moving from a current screen to another screen such as a previous screen or a next screen. When there is information that has not been completely output on the first screen 100, the object may be a button that may be selected to additionally view remaining information. Also, the object may be information for controlling the content reproduction apparatus, such as a volume control button, a channel control button, or the like.

In FIG. 1, the first screen 100 includes objects 101, 102, 103, 104, and 105. In FIG. 1, some objects 101, 102, 103, and 104 among the objects 101, 102, 103, 104, and 105 may each be a single piece of content. Also, the object 105 may be a function key that may be selected to perform a particular function. In FIG. 1, the object 105 may be a voice assistant service activation indication. The voice assistant service activation indication may be an indication indicating that the voice assistant service of the content reproduction apparatus is activated.

A focus 110 may be displayed and located to point out, emphasize or highlight any one of the objects included in the first screen 100. The focus 110 may be used to select an object. That is, when the focus 110 identifies or corresponds to one object, or is located on one object, the user may select an object corresponding to the focus 110, by using a method of pressing a key included in the control device.

When the screen of the content reproduction apparatus changes, the focus 110 may be automatically displayed on one object and output. For example, the focus 110 may be located on the leftmost object or the uppermost object in the changed screen. The user may move the focus 110 to a desired object by inputting a move key or the like included in the control device. The user may move the focus 110 to a desired location among the objects 101, 102, 103, 104, and 105 included in the first screen 100.

In FIG. 1, the focus 110 is located on the object 105 indicating the voice assistant service activation indication.

In an embodiment, the user may not know which of the objects 101, 102, 103, 104, and 105 included in the first screen 100 to select. For example, there may be no object desired by the user among the objects 101, 102, 103, 104, and 105, or the user may not know which object among the objects 101, 102, 103, 104, and 105 to select. Alternatively, the user may not know how to select one of the objects 101, 102, 103, 104, and 105.

In an embodiment, when the user does not select any particular object, the content reproduction apparatus may determine whether a certain time elapses after the first screen 100 is output. When the user does not select any one of one or more objects included in the first screen 100 for a certain time after the first screen 100 is output, the content reproduction apparatus may output guide information to help the user select an object.

In an embodiment, the content reproduction apparatus may generate and output different guide information according to which object the focus 110 is currently located on.

In an embodiment, the content reproduction apparatus may provide the voice assistant service. The voice assistant service may be a service that performs an interaction between the user and the content reproduction apparatus by utterance. In order to provide the voice assistant service, the content reproduction apparatus may receive the user's utterance input through a microphone provided in the content reproduction apparatus and output a result in response to the utterance.

In order for the user to input an utterance to the content reproduction apparatus by using the voice assistant service, the voice assistant service needs to be activated first. When an utterance input start signal is received from the user, the content reproduction apparatus may activate the voice assistant service and wait for a next utterance input from the user.

When a particular utterance is received from the user, the content reproduction apparatus may recognize the particular utterance as the utterance input start signal and activate the voice assistant service. For example, the user may input the utterance input start signal by uttering an utterance such as "Hi Bixby" or "Bixby, listen to me". In this case, the "Bixby" may be a name of a service provider providing the voice assistant service, but is not limited thereto. Alternatively, in order to use the voice assistant service, the user may determine a particular utterance in advance with respect to the content reproduction apparatus and set the particular utterance as the utterance input start signal for activating the voice assistant service. In an embodiment, the user may input an utterance input end signal by uttering an utterance such as "Bye Bixby" or "Goodbye Bixby".

In an embodiment, the control device may include a dedicated key for activating the voice assistant service. When the user presses a voice assistant service provision key of the control device, the content reproduction apparatus may recognize the same as the utterance input start signal and wait for an utterance command from the user. When the user presses and then releases the voice assistant service provision key of the control device once, the content reproduction apparatus may recognize the same as the utterance input start signal, recognize a subsequent utterance utterance from the user as a control command, and, when the voice assistant service provision key is pressed once again, recognize the same as the utterance input end signal.

In another embodiment, the user may give a control command by utterance while pressing the voice assistant service provision key of the control device. For example, the user may select, by utterance, any one of the objects 101, 102, 103, 104, and 105 output on the first screen 100. After the user gives the control command while pressing the voice assistant service provision key, the user may release the pressing of the voice assistant service provision key. When the user releases the pressing of the voice assistant service provision key, the content reproduction apparatus may recognize the same as the utterance input end signal. That is, when the user utters an utterance while pressing the voice assistant service provision key included in the control device, the content reproduction apparatus may recognize the utterance input from the user as the control command.

In FIG. 1, the first screen 100 may include the voice assistant service activation indication as one object 105. The voice assistant service activation indication may be an indication indicating that the voice assistant service of the content reproduction apparatus is activated. That is, when the utterance input start signal is received from the user, the content reproduction apparatus may activate the voice assistant service and output the voice assistant service activation indication on the screen to inform the user of the activated voice assistant service. The user may recognize that the voice assistant service has been activated, by using the voice assistant service activation indication, and may input a control command to the content reproduction apparatus by utterance.

In an embodiment, when the content reproduction apparatus does not receive any utterance from the user even though a certain time elapses after the utterance input start signal is received from the user, the content reproduction apparatus may determine that the user does not select an object, and may output utterable guide information.

In an embodiment, the content reproduction apparatus may receive the utterance input end signal from the user without any utterance input after the utterance input start signal is received from the user. For example, the user may press the voice assistant service provision key included in the control device and then press the voice assistant service provision key again without any utterance utterance. Alternatively, the user may release the pressing of the voice assistant service provision key without any utterance while pressing the voice assistant service provision key. Alternatively, the user may not speak any utterance for a certain time after the voice assistant service provision key is pressed.

Alternatively, after the utterance input start signal is received from the user, the content reproduction apparatus may receive an utterance from the user that the user does not know what information to select. For example, when an utterance signal, such as "What should I do?", "Tell me", or the like, is received from the user, the content reproduction apparatus may determine that the user has difficulty in selecting an object and output the utterable guide information for a next selection to the user. In this case, the utterance signal uttered by the user indicating that the user has difficulty in selection may be a preset utterance signal to use the voice assistant service of the content reproduction apparatus. Alternatively, the content reproduction apparatus may analyze the utterance received from the user by using an artificial intelligence (AI) function and may derive a result that the user is unable to select a particular object. When the content reproduction apparatus determines that the user does not select an object, the content reproduction apparatus may output the guide information.

The utterable guide information may be a screen indicating the guide information or may be an utterance. The content reproduction apparatus may overlay and output the utterable guide information over the first screen 100 or may output the utterable guide information by utterance through an audio outputter (not shown) included in the content reproduction apparatus.

In FIG. 1, when the user does not select any particular object on the first screen 100 by utterance, the content reproduction apparatus may automatically output a second screen 120. The second screen 120 is substantially the same as the first screen 100, but may be identified from the first screen 100 in that the second screen 120 further includes a voice assistant service result indication 121 and utterable guide information 122.

The voice assistant service result indication 121 may be information indicating that a result of the voice assistant service is displayed to the user.

When the content reproduction apparatus does not receive any utterance command from the user, the content reproduction apparatus may output different utterableguide information 122 according to which object the focus 110 is currently located on the first screen 100. Among the objects 101, 102, 103, 104, and 105 of the first screen 100 in FIG. 1, because the focus 110 is located on the object 105 indicating the voice assistant service activation indication, the content reproduction apparatus may generate and output corresponding guide information.

For example, it is assumed that, after the voice assistant service of the content reproduction apparatus is activated, the user transmits a control command to the content reproduction apparatus by utterance, "Recommend a movie". The content reproduction apparatus may receive the control command in the form of utterance from the user and accordingly output the first screen 100, which is a result thereof. Preview screens of a plurality of movies recommended by the content reproduction apparatus may be output as still images or moving pictures on the first screen 100. The movies included in the first screen 100 may be the objects 101, 102, 103, and 104, respectively. When the user does not select one of the objects 101, 102, 103, 104, and 105 included in the first screen 100 after the first screen 100 is output, the content reproduction apparatus may generate guide information for a next selection to the user. Because the focus 110 is on the object 105 indicating the voice assistant service activation indication on the first screen 100, the content reproduction apparatus may output, to the user, information indicating how the content reproduction apparatus comprehends the control command of the user or inform the user of utterance word information used by the user to select an object. The utterance word information used by the user to select the object may be information such as "If a movie you want to watch is displayed on the screen, please say the title of the movie or say 'first one'" as illustrated in the utterable guide information 122 output on the second screen 120 in FIG. 1. Alternatively, the content reproduction apparatus may output, as guide information, information such as "The movies I recommend are as follows" to indicate how the content reproduction apparatus comprehends the control command of the user.

The user may select one of the objects 101, 102, 103, and 104 output on the second screen 120 by using the utterable-guide information 122. The user may select one of the objects 101, 102, 103, and 104 by uttering "First one" or "Second one" or uttering the title of a particular movie.

Figure 2:
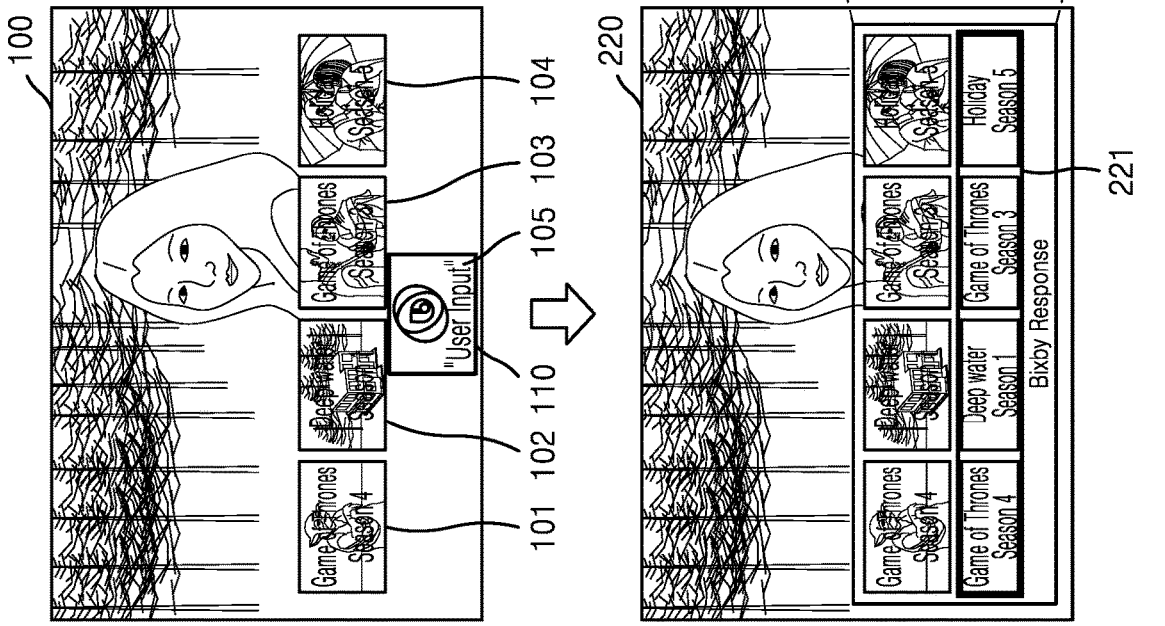
FIG. 2 is a diagram of a case where a content reproduction apparatus provides guide information to a user, according to another embodiment.

FIG. 2 is a diagram of a case where the content reproduction apparatus provides guide information to a user, according to another embodiment. Referring to FIG. 2, the content reproduction apparatus may output the first screen 100. The content reproduction apparatus may be an utterance-controlled apparatus using the voice assistant service. The first screen 100 of FIG. 2 may be the same screen as the first screen 100 of FIG. 1. The first screen 100 may be a screen output by the content reproduction apparatus in response to a control command of the user. For example, the user may input a control command such as "Recommend a movie" to the content reproduction apparatus. The content reproduction apparatus may output, on the first screen 100, preview screens of a plurality of movies recommended by the content reproduction apparatus as still images or moving pictures.

After the first screen 100 is output, the user may select one of objects 101, 102, 103, 104, and 105 included in the first screen 100. For example, when the user selects the object 101, the content reproduction apparatus may reproduce Games of Thrones Season 4, which is a TV show corresponding to a movie preview of the object 101 selected by the user, or may output additional information about the TV show Games of Thrones Season 4. Alternatively, when there is information that the user needs to additionally select or input, the content reproduction apparatus may output a screen on which the user may additionally select or input. For example, the content reproduction apparatus may output a screen for the user to input a resolution at which the user wants the selected TV show Games of Thrones Season 4 to be output or may output a screen for the user to input information for payment when payment is required to watch the TV show.

In an embodiment, the user may not select any object among the objects 101, 102, 103, 104, and 105 included in the first screen 100. When one of the objects 101, 102, 103, 104, and 105 included in the first screen 100 is not selected by the user, the content reproduction apparatus may output the guide information for a next selection according to an object on which the focus 110 is located.

A case where one of the objects is not selected may include a case where the user does not select any object for a certain time after the first screen 100 is output. After the first screen 100 is output, the user may select one of the objects included in the first screen 100 by utterance by using a control device, such as a remote controller, or by using a touch screen, but may not select any object until the certain time elapses.

Alternatively, the case where the object is not selected may include a case where additional information for selecting an object is requested by the user or a case where no utterance is input after the utterance input start signal is received by the user. Also, a case where an utterance for selecting an object is not input by the user after the utterance input start signal is received may include a case where the utterance input end signal is received from the user in a state in which an utterance for selecting an object is not input after the utterance input start signal is received.

In an embodiment, when the object is not selected by the user, the content reproduction apparatus may generate and output utterable guide information 221. Because the object on which the focus 110 is located is on the object 105 indicating the voice assistant service activation indication, the content reproduction apparatus may output information, which may help the user to select an object, as utterable guide information. That is, the utterable guide information 221 may be information which helps the user to select one content among the objects 101, 102, 103, 104, and 105 included in the first screen 100. The information for selecting content may include utterance word information used to select each content. The utterance word information may be information indicating an utterance command that a user may utter by utterance and give a control command. The user may view pieces of utterance word information 226, 227, 228, and 229 respectively for objects 222, 223, 224, and 225 included in the utterable guide information 221 and utter a particular utterance word by utterance to select a desired object. For example, when the user wants to watch the Games of Throngs Season 4, the user may select the desired TV show by uttering text "Games of Thrones, Season 4" in the utterance word information 226 which is displayed under a preview screen of the object 222 of the TV show.

In an embodiment, when the utterable guide information 221 includes the utterance word information, the utterable guide information 221 may further include information indicating that the utterance word information is an utterance command that the user may utter and give a control command. The information indicating that the utterance word information is the utterance command that the user may utter and give a control command may indicate that the text is an utterance word by displaying the utterance word included in the utterable guide information 221 in a particular font, a particular color, or a particular logo next to the utterance word.

Figure 3:
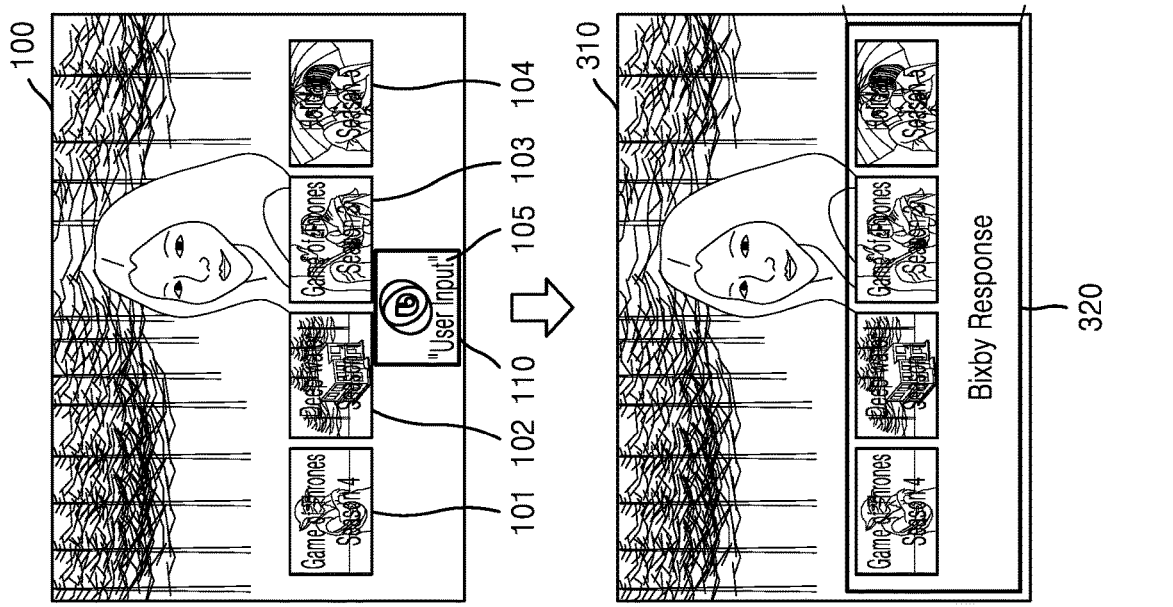
FIG. 3 is a diagram of a case where a content reproduction apparatus provides guide information to a user, according to another embodiment.

FIG. 3 is a diagram of a case where the content reproduction apparatus provides guide information to a user, according to another embodiment. In FIG. 3, the content reproduction apparatus may output the first screen 100. The first screen 100 of FIG. 3 may be the same screen as the first screen 100 of FIGS. 1 and 2. In an embodiment, when the user does not select an object with respect to the first screen 100, the content reproduction apparatus may generate and output guide information.

Because an object on which the focus 110 is located is on the object 105 indicating the voice assistant service activation indication, the content reproduction apparatus may output information, which may help the user to select an object, as guide information.

In FIG. 3, when there are other objects in addition to the objects 101, 102, 103, 104, and 105 included in the first screen 100, guide information 320 may further include first guide information 321 for moving to another screen to output another object. The first guide information 321 may be information that may be selected to move to another screen or control a volume. The first guide information 321 may be output to a guide information screen or output to the user as an utterance.

The first guide information 321 is information including content such as "You can see more results by using a [left/right] button of the remote controller, or please say 'show me more'", and may be output on the screen or may be output by utterance together with or separately from the screen. When the first guide information 321 is output by utterance, though not shown in FIG. 3, arrows indicating the left and right may be overlaid and output on a screen 310. The user may see the arrows indicating the left and right and control the screen to move in a left or right direction by using the remote controller or by using utterance.

Alternatively, the guide information 320 may include information about how the content reproduction apparatus comprehends the control command of the user in relation to the voice assistant service. The content reproduction apparatus may output, to the user, the guide information 320 including second guide information such as "By pressing the [DOWN] button on the remote controller, you can see how Bixby comprehended your words", and when the user wants to determine how the content reproduction apparatus comprehends the control command of the user by using the voice assistant service, the user may determine what actions the user needs to take by using the guide information 320.

Figure 4:
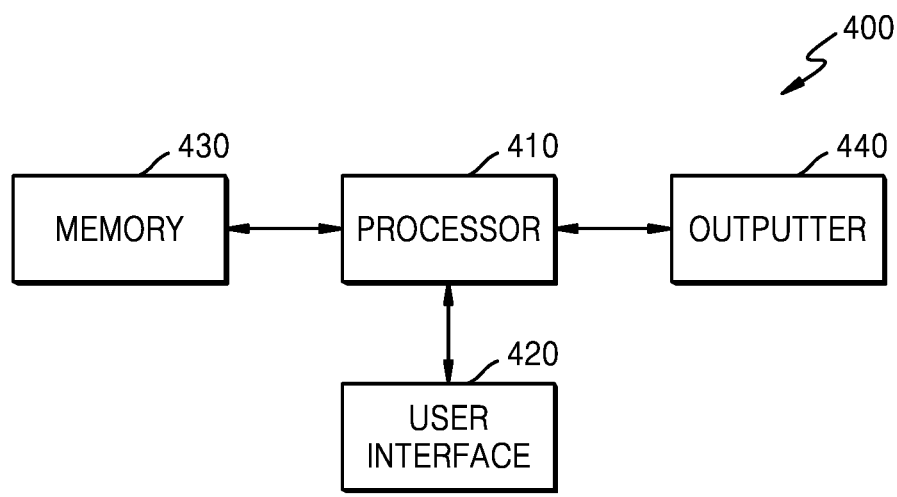
FIG. 4 is a block diagram of a configuration of a content reproduction apparatus, according to an embodiment.

FIG. 4 is a block diagram of a configuration of a content reproduction apparatus, according to an embodiment. Referring to FIG. 4, a content reproduction apparatus 400 may include a processor 410, a user interface 420, a memory 430, and an outputter 440.

The content reproduction apparatus 400 may be a TV, but is not limited thereto, and may be implemented as an electronic device including a display. For example, the content reproduction apparatus 400 may be implemented as various electronic devices such as a mobile phone, a tablet PC, a digital camera, a camcorder, a laptop computer, a tablet PC, a desktop computer, an electronic book terminal, a digital broadcasting terminal, a personal digital assistant (PDA), a portable multimedia player (PMP), a navigation device, an MP3 player, a wearable device, etc. Also, the content reproduction apparatus 400 may be in a fixed type or a mobile type, and may be a digital broadcast receiver capable of receiving digital broadcast. The content reproduction apparatus 400 may be implemented as a flat display apparatus, a curved display apparatus which is a screen having a curvature, or a curvature-adjustable flexible display apparatus. An output resolution of the content reproduction apparatus 400 may include, for example, high definition (HD), full HD, ultra HD, or resolutions clearer than ultra HD.

The content reproduction apparatus 400 may be controlled by various types of control devices (not shown) for controlling the content reproduction apparatus 400, such as a remote controller or a mobile phone. Alternatively, when a display (not shown) included in the outputter 440 of the content reproduction apparatus 400 is implemented as a touch screen, the content reproduction apparatus 400 may be controlled by a user's finger or an input pen. In an embodiment, the content reproduction apparatus 400 may provide the voice assistant service. Accordingly, the content reproduction apparatus 400 may be controlled by the user's utterance, and may enable a conversation between the user and the content reproduction apparatus 400 by outputting an utterance to the user.

The processor 410 may execute one or more instructions stored in the memory 430 to generate guide information and output the generated guide information through the outputter 440. The processor 410 may generate guide information for a next selection according to an object on which a focus is located on a first screen and output the generated guide information.

When one of the objects is not selected by the user for a certain time after the first screen is output, or when additional information for selecting an object is requested by the user through the user interface 420, the processor 410 may generate the guide information. When the utterance input start signal is received from the user through the user interface 420, the processor 410 may activate the voice assistant service. When an input for selecting an object, for example, an optical signal through utterance or the control device, is not received from the user in a state in which the voice assistant service is activated, or when the utterance input end signal is received from the user through the user interface 420 in a state in which no utterance is received, the processor 410 may determine that the user does not select an object, and may generate the guide information.

In an embodiment, the processor 410 may store one or more instructions in a memory (not shown) included in the processor 410 and execute the one or more instructions stored in the memory included therein to control operations, which will be described below, to be performed. That is, the processor 410 may execute at least one instruction or program, stored in the memory 430 or an internal memory included in the processor 410, to perform a certain operation.

In an embodiment, the processor 410 may include a graphic processing unit (GPU) (not shown) for graphic processing corresponding to a video. The processor 410 may be implemented as a system on chip (SoC) in which a core (not shown) and a GPU (not shown) are integrated. The processor 410 may include a single core, a dual core, a triple core, a quad core, and multiple cores thereof.

In an embodiment, the processor 410 may include a voice assistant processor (not shown) that provides the voice assistant service. The voice assistant processor may execute one or more instructions to provide a voice assistant service function.

The voice assistant service may be a service that provides a conversation with the user. The voice assistant processor may provide a voice assistant service that enables exchange of utterance with the user as if a person directly communicates with the user in consideration of a situation of the user or a situation of the content reproduction apparatus 400. Also, the voice assistant processor may appropriately generate information required by the user like a personal secretary of the user and allow the content reproduction apparatus 400 to provide the generated information to the user.

In an embodiment, the voice assistant processor may be implemented as a training model of the voice assistant service by using a neural network that is artificial intelligence. In detail, the neural network, as an artificial intelligence algorithm, may be a training model trained by using at least one of machine learning, a neural network, a gene, deep learning, and a classification algorithm. The training model of the voice assistant service may include, for example, a training model for interpreting the user's input utterance and a training model for generating guide information to be provided to the user, but is not limited thereto.

The processor 410 may execute the one or more instructions stored in the memory 430 or the internal memory to detect whether the user has selected an object and to generate guide information.

The user interface 420 may receive a user input for controlling the content reproduction apparatus 400. In an embodiment, the user interface 420 may receive the user's utterance as a control command. The user may use the user interface 420 to give a control command to the content reproduction apparatus 400 by utterance or select one of the objects output on the first screen. The user interface 420 may include a microphone (not shown) capable of receiving an utterance from the user and may recognize the user's utterance as a control command. The user interface 420 may receive a control command through various types of devices for controlling the content reproduction apparatus 400, such as a remote controller or a mobile phone, in addition to the control command in the form of utterance. When a display of the content reproduction apparatus 400 is implemented as a touch screen, the user interface 420 may receive an input through a user's finger or the input pen. That is, the user interface 420 may receive a signal through a touch panel that detects a user's touch. Alternatively, the user interface 420 may receive a signal through a user input device including a button for receiving a user's push manipulation, a wheel for receiving a user's rotation manipulation, a keyboard, a dome switch, and the like, but is not limited thereto. Also, when the content reproduction apparatus 400 is manipulated by the control device, the user interface 420 may receive a control signal received from a remote control device.

The user interface 420 may receive a control command for the content reproduction apparatus 400 by using short-range communication including infrared rays or Bluetooth.

The memory 430 may include at least one storage medium among a flash memory type memory, a hard disk type memory, a multimedia card micro type memory, a card type memory (e.g., an secure digital (SD) memory, an extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In an embodiment, the memory 430 may store a program for processing and control by the processor 410. Also, the memory 430 may store one or more instructions executable by the processor 410. The memory 430 may store a program for providing the voice assistant service. In an embodiment, content may be stored in the memory 430. The content may be divided into an audio, a video and/or additional information, and the divided audio, video and/or additional information may be stored in the memory 430 under control by the processor 410.

The outputter 440 may output the content. The outputter 440 may include one or more of a display (not shown) for outputting an image included in the content and an audio outputter (not shown) for outputting an audio included in the content. In an embodiment, when one of the objects included in the first screen is not selected by the user, the processor 410 may control the audio outputter to output the guide information in the form of utterance, or may control the display to output a screen indicating the guide information. Alternatively, the processor 410 may control both the audio outputter and the display to output the guide information.

Figure 5:
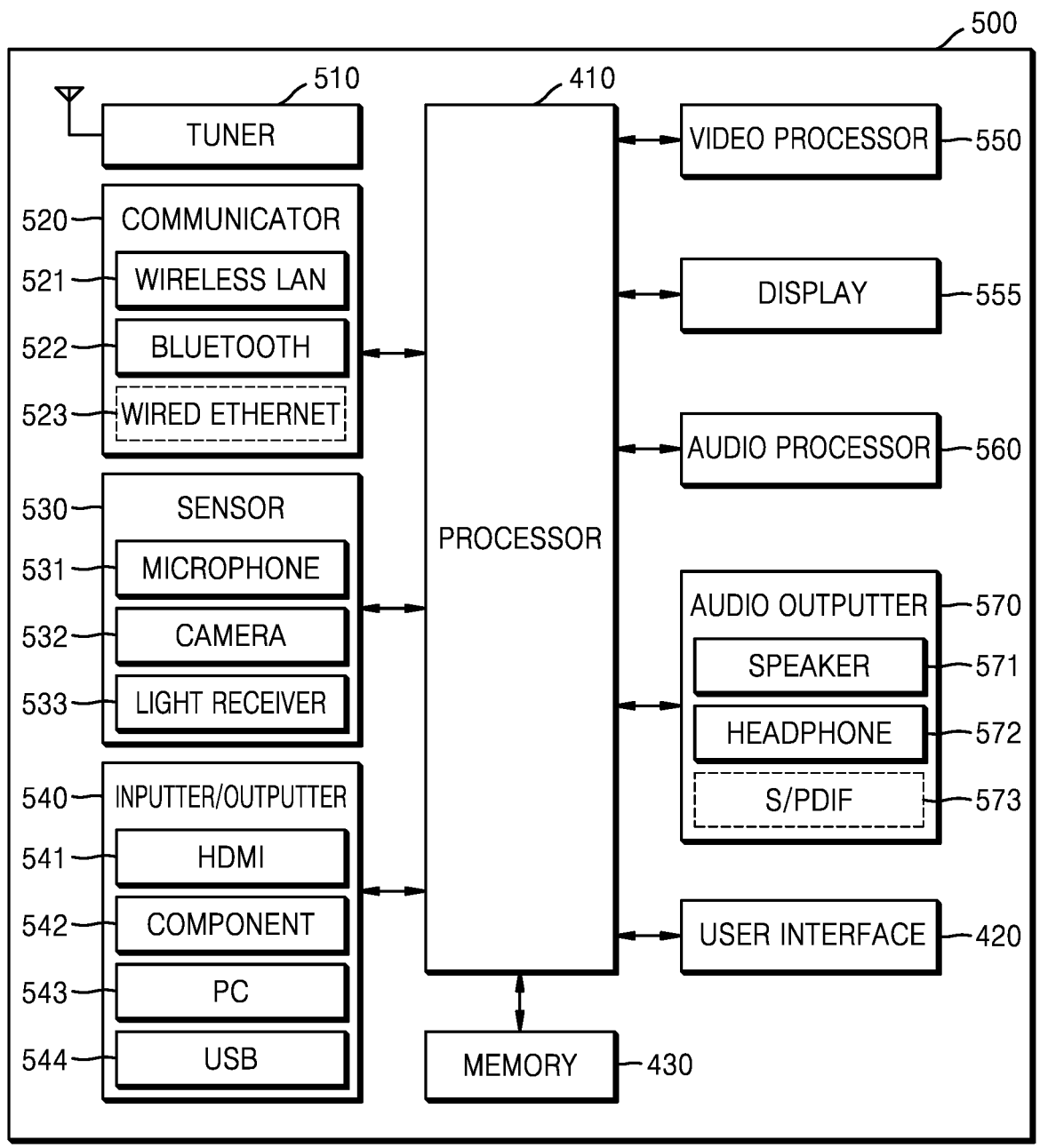
FIG. 5 is a block diagram of a configuration of a content reproduction apparatus, according to another embodiment.

FIG. 5 is a block diagram of a configuration of a content reproduction apparatus, according to another embodiment.

As shown in FIG. 5, a content reproduction apparatus 500 may further include a tuner 510, a communicator 520, a sensor 530, an inputter/outputter 540, a video processor 550, a display 555, an audio processor 560, and an audio outputter 570, in addition to the processor 410, the user interface 420, and the memory 430.

The processor 410, the user interface 420, and the memory 430 are the same as those described with reference to FIG. 4, and thus a description thereof will be omitted in FIG. 5.

The tuner 510 may tune and select only a frequency of a channel to be received by the content reproduction apparatus 500 from among a plurality of propagation components through amplification, mixing, resonance, and the like of content received in a wired or wireless manner. The content may include a broadcast signal, and may include one or more of an audio, a video which is an image signal, and additional information. The additional information may include a location where the content is stored, a title of the content, etc.

The content received through the tuner 510 is decoded (e.g., audio decoding, video decoding, or additional information decoding) to be divided into an audio, a video, and/or additional information. The divided audio, video, and/or additional information may be stored in the memory 430 under control by the processor 410.

The tuner 510 of the content reproduction apparatus 500 may be provided as one or a plurality of tuners. The tuner 510 may be implemented as an all-in-one type device with the content reproduction apparatus 500, or may be implemented as a separate device (e.g., a set-top box (not shown)) having a tuner electrically connected to the content reproduction apparatus 500, or a tuner (not shown) connected to the inputter/outputter 540.

The communicator 520 may connect the content reproduction apparatus 500 to an external device (e.g., an external server) under control by the processor 410. The processor 410 may receive content from the external server connected through the communicator 520, download an application, or perform web browsing.

The communicator 520 may include one of a wireless local area network (LAN) 521, Bluetooth 522, and wired Ethernet 523 corresponding to the performance and structure of the content reproduction apparatus 500. Also, the communicator 520 may include a combination of the wireless LAN 521, the Bluetooth 522, and the wired Ethernet 523. The communicator 520 may receive a control signal through a control device (not shown) under control by the processor 410. The control signal may be implemented as a Bluetooth type signal, an RF signal type signal, or a Wi-Fi type signal.

The communicator 520 may further include other short-range communication (e.g., near-field communication (NFC) (not shown) and Bluetooth low energy (BLE) (not shown)) in addition to the Bluetooth 522. According to an embodiment, the communicator 520 may be coupled to a terminal (not shown) through short-range communication, such as the Bluetooth 522 or the BLE, and may transmit and receive a connection signal.

The sensor 530 may sense a user's utterance, a user's image, or a user's interaction, and may include a microphone 531, a camera 532, and a light receiver 533. The microphone 531 may receive an utterance uttered by the user. The microphone 531 may convert the received utterance into an electrical signal and transmit the electrical signal to the processor 410.

According to an embodiment, the microphone 531 may receive, from the user, an utterance for selecting one of the objects included in the first screen. According to an embodiment, the microphone 531 may receive a particular utterance recognized as an utterance input start signal. For example, the user may input the utterance input start signal by uttering an utterance such as "Hi Bixby" or "Bixby, listen to me". Alternatively, in order to use the voice assistant service, the user may set a particular utterance in advance with respect to the content reproduction apparatus and set the particular utterance as the utterance input start signal for activating the voice assistant service.

The processor 410 may receive an utterance input from the user through the microphone 531, analyze the utterance, and determine whether the utterance is an utterance input start signal, an utterance input end signal, or an utterance for selecting an object. When the user's utterance is the utterance input start signal, the processor 410 may activate the voice assistant service and receive the user's utterance input thereafter as a control command for selecting an object.

The camera 532 may receive an image (e.g., consecutive frames) corresponding to a user's motion including a gesture in a camera recognition range. The camera 532 may receive, from the user, a motion corresponding to content control from the control device (not shown) such as a remote controller or the like.

The light receiver 533 may receive an optical signal transmitted from the control device. The light receiver 533 may receive an optical signal corresponding to a user input (e.g., touching, pressing, a touch gesture, an utterance, or a motion) from a control device (not shown) such as a remote controller, a mobile phone, or the like. The control signal may be extracted from the received optical signal under control by the processor 410.

The inputter/outputter 540 may receive a video (e.g., a moving picture signal, a still image signal, etc.), an audio (e.g., an utterance signal, a music signal, etc.), and additional information (e.g., a description of content, a title of the content, or a location where the content is stored) from a device outside the content reproduction apparatus 500 under control by the processor 410. The inputter/outputter 540 may include one of a high-definition multimedia interface (HDMI) port 541, a component jack 542, a PC port 543, and a universal serial bus (USB) port 544. The inputter/outputter 540 may include a combination of the HDMI port 541, the component jack 542, the PC port 543, and the USB port 544.

The memory 430 may store instructions and programs for processing and control by the processor 410, and may store data input to the content reproduction apparatus 500 or output from the content reproduction apparatus 500. Also, the memory 430 may store data necessary for an operation of the content reproduction apparatus 500. Also, the programs stored in the memory 430 may be classified into a plurality of modules according to functions thereof.

The memory 430 may store one or more programs for performing the voice assistant service. The memory 430 may include utterance information that may be output by the content reproduction apparatus 500 to perform the voice assistant service. Also, the memory 430 may store the utterance input start signal and the utterance input end signal. Moreover, the memory 430 may include one or more programs for generating the guide information.

The processor 410 may control the overall operation of the content reproduction apparatus 500 and a signal flow between internal components of the content reproduction apparatus 500, and perform a function of processing data. When there is a user's input or a preset and stored condition is satisfied, the processor 410 may execute operating system (OS) and various applications stored in the memory 430.

According to an embodiment, the processor 410 may execute the one or more instructions stored in the memory 430 to activate the voice assistant service and generate the guide information.

Also, the processor 410 may include an internal memory (not shown). In this case, at least one of data, programs, and instructions stored in the memory 430 may be stored in the internal memory (not shown) of the processor 410.

The video processor 550 may process image data to be displayed by the display 555 and perform various image processing operations such as decoding, rendering, scaling, noise filtering, frame rate conversion, and resolution conversion on the image data.

The display 555 may display, on a screen, an image signal included in the content received through the tuner 510 under control by the processor 410. Also, the display 555 may display content (e.g., a moving picture) input through the communicator 520 or the inputter/outputter 540. The display 555 may output an image stored in the memory 430 under control by the processor 410.

In an embodiment, the display 555 may output the guide information. The guide information is provided to allow the user to easily select a next object and may include utterance word information used to select one or more objects. Alternatively, the guide information may further include information indicating that the utterance word information is an utterance word. Alternatively, the guide information may include control information used to select one or more of screen movement or volume control. Alternatively, the guide information may include information for describing a method of selecting content, or information about the content. Alternatively, the guide information may include one or more of common information about a plurality of pieces of content, and an information list about each content. Alternatively, the guide information may include descriptive information for describing why the first screen is output, that is, how the content reproduction apparatus 500 comprehends a control command of the user and generates the first screen, and/or information that may be requested by the user to use other information.

When the display 555 is implemented as a touch screen, the display 555 may be used as an input device in addition to an output device. For example, the display 555 may include at least one of a liquid crystal display, a thin film transistor-liquid crystal display, an organic light-emitting diode, a flexible display, a three-dimensional (3D) display, or an electrophoretic display. According to an implementation form of the content reproduction apparatus 500, the content reproduction apparatus 500 may include two or more displays 555.

The audio processor 560 performs processing on audio data. The audio processor 560 may perform various types of processing, such as decoding, amplification, noise filtering, etc., on the audio data.

The audio outputter 570 may output an audio included in the content received through the tuner 510, an audio input through the communicator 520 or the inputter/outputter 540, and an audio stored in the memory 430 under control by the processor 410. Also, the audio outputter 570 may output an utterance for providing the voice assistant service.

The audio outputter 570 may include at least one of a speaker 571, a headphone output terminal 572, and a Sony/Philips digital interface (S/PDIF) output terminal 573. The audio outputter 570 may output the guide information in the form of utterance.

The user interface 420 may receive a user input for controlling the content reproduction apparatus 500. The user input may be a control command in the form of utterance or an optical signal received from the control device such as a remote controller, etc. Alternatively, the user interface 420 may receive the control command by using a touch panel for detecting a user's touch, a button for receiving a user's push manipulation, a wheel for receiving a user's rotation manipulation, a keyboard, a dome switch, and the like, which are included in the control device. The user interface 420 may receive a control command for the content reproduction apparatus 500 by using short-range communication including infrared rays or Bluetooth.

Though not shown in FIG. 5, the content reproduction apparatus 500 may further include a voice assistant processor (not shown) for providing the voice assistant service. The voice assistant processor may be included in the processor 410, or may be included in the content reproduction apparatus 500 as a processor separate from the processor 410.

The voice assistant processor may execute one or more instructions to provide a service for providing a conversation with the user. In an embodiment, the voice assistant processor may be implemented as a training model of the voice assistant service by using a neural network that is artificial intelligence.

Block diagrams of the content reproduction apparatuses 400 and 500 illustrated in FIGS. 4 and 5 are provided for illustration of embodiments. Components of the block diagrams may be integrated, added, or omitted depending on the specifications of content reproduction apparatuses that are actually implemented. For example, two or more components may be integrated into one component, or one component may be subdivided into two or more components, as necessary. A function executed by each component is intended to describe embodiments, and a detailed operation or apparatus thereof does not limit the scope of the disclosure.

Figure 6:
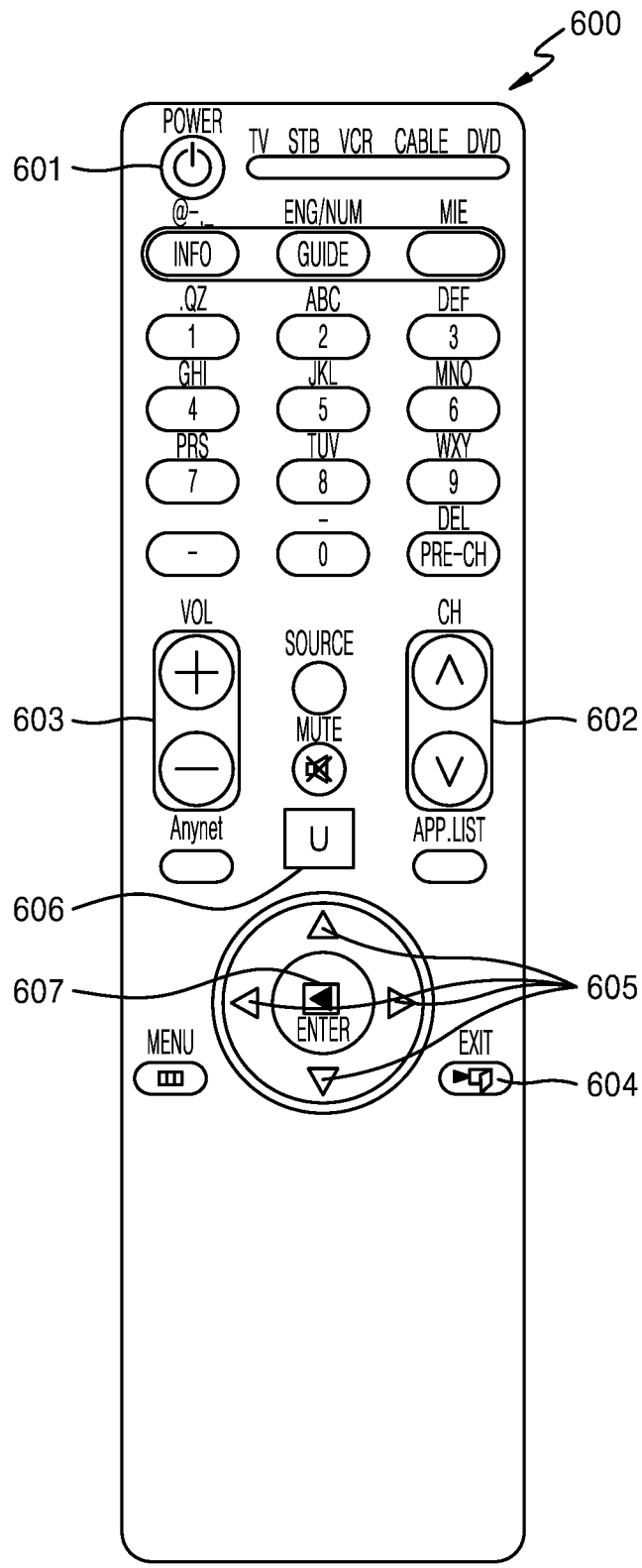
FIG. 6 is a diagram of a control device used to perform a method of providing guide information, according to an embodiment.

FIG. 6 is a diagram of a control device used to perform a method of providing guide information, according to an embodiment. Referring to FIG. 6, the control device 600 may be implemented as a remote controller, but is not limited thereto, and may be implemented as various types of devices for controlling the content reproduction apparatus 400, such as a mobile phone, etc. Alternatively, when the display of the content reproduction apparatus 400 is implemented as a touch screen, the control device 600 may be replaced with a user's finger or an input pen. Also, the control device 600 may transmit a control command to the content reproduction apparatus 400 by using short-range communication including infrared rays or Bluetooth.

The control device 600 may control a function of the content reproduction apparatus 400 by using at least one of a provided key (including a button), a touchpad, a microphone (not shown) capable of receiving a user's utterance, and a sensor (not shown) capable of recognizing a motion of the control device 600.

Referring to FIG. 6, the control device 600 may include a power on/off button 601 for turning on or off the power of the content reproduction apparatus 400, a channel change button 602, a volume control button 603, a button 604 for returning to a previous screen, a movement button 605 for moving a focus to one of objects included in a screen, and a button 607 for selecting an object. When there are additional objects in addition to objects output on a current screen, the movement button 605 may be selected to move to one of left, right, upper, and lower screens of the current screen in order to view the additional objects.

In an embodiment, the control device 600 may further include a voice assistant service provision key 606. The voice assistant service provision key 606 may be a dedicated key for activating the voice assistant service. When the user presses the voice assistant service provision key 606 of the control device, the content reproduction apparatus 400 may activate the voice assistant service. In an embodiment, when the user inputs the voice assistant service provision key 606, the content reproduction apparatus 400 may recognize the input as an utterance input start signal and wait for an utterance command from the user. After the user inputs an utterance while pressing the voice assistant service provision key 606, the user may release the pressing of the voice assistant service provision key 606. When the voice assistant service provision key 606 is long-pressed and then returns to an original state, the content reproduction apparatus 400 may recognize the same as an utterance input end signal.

In an embodiment, when the user presses the voice assistant service provision key 606 of the control device once and then releases the voice assistant service provision key 606, the content reproduction apparatus 400 may recognize the same as an utterance input start signal. After pressing and then releasing the voice assistant service provision key 606, the user may give a control command by utterance. Thereafter, the user may press the voice assistant service provision key 606 again to generate an utterance input end signal. That is, when the user presses the voice assistant service provision key 606, the content reproduction apparatus 400 may recognize the same as an utterance input start signal and recognize utterance utterance from the user as a control command until the next time the voice assistant service provision key 606 is pressed.

In an embodiment, the content reproduction apparatus 400 may not receive any utterance from the user even though a certain time elapses after the voice assistant service provision key 606 is input and the utterance input start signal is received. After pressing the voice assistant service provision key 606 included in the control device 600, the user may press the voice assistant service provision key 606 again without any utterance utterance. Alternatively, the user may release the pressing of the voice assistant service provision key 606 without any utterance while pressing the voice assistant service provision key 606. Alternatively, the user may not speak any utterance for a certain time after pressing the voice assistant service provision key 606.

Alternatively, the user may generate an utterance input start signal by pressing the voice assistant service provision key 606 and then utter an utterance indicating that the user does not know what information to select. For example, when an utterance signal, such as "What should I do?", "Tell me", or the like, is received from the user, the content reproduction apparatus 400 may determine that the user has difficulty in selecting an object.

When the user does not select an object, the content reproduction apparatus 400 may output guide information for a next selection to the user.

Figure 7:
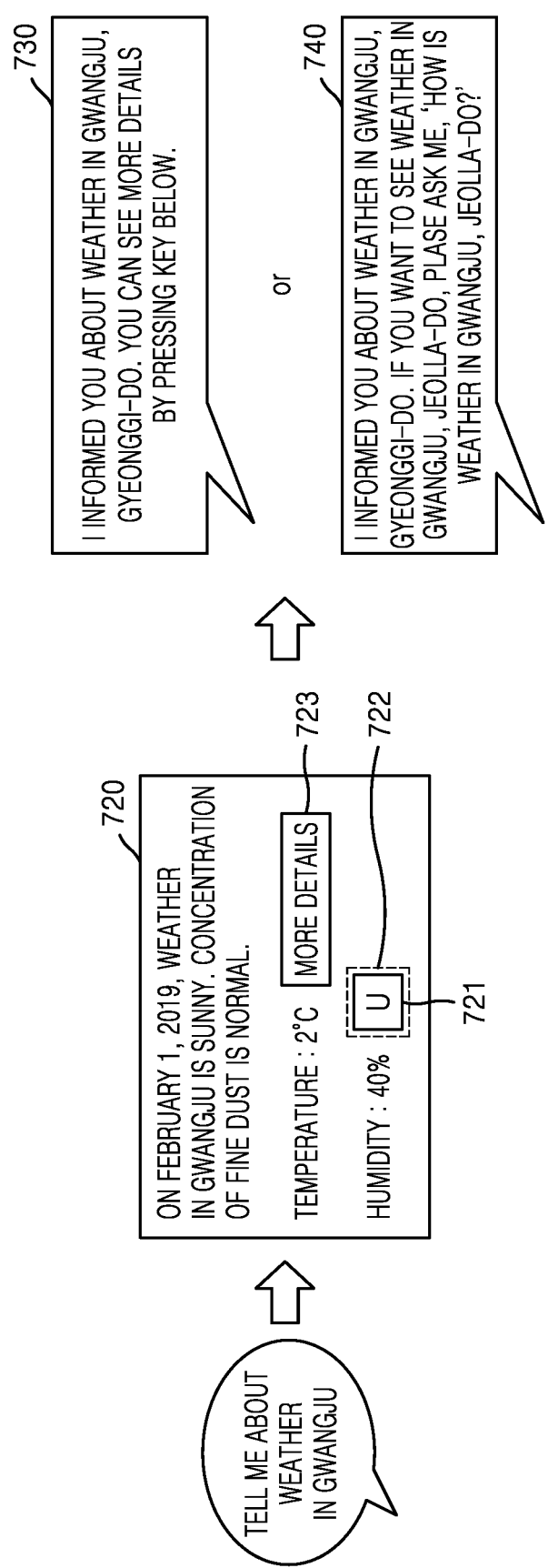
FIG. 7 is a diagram of guide information provided to a user according to an object on which a focus is placed, according to an embodiment.

FIG. 7 is a diagram of guide information provided to a user according to an object on which a focus is located, according to an embodiment.

Referring to FIG. 7, the content reproduction apparatus 400 may receive, from the user, a control command in the form of utterance, such as "Tell me about weather in Gwangju". The voice assistant service may have already been activated, or the content reproduction apparatus 400 may receive a user's utterance control command and then activate the voice assistant service by recognizing the utterance control command as an utterance input start signal for activating the voice assistant service.

The content reproduction apparatus 400 may output a first screen 720 indicating a result in response to the control command from the user. The content reproduction apparatus 400 may output, on the first screen 720, a result that best matches the control command requested by the user by performing an artificial intelligence function. In Korea, there are regions called "Gwangju" respectively in Jeolla-do and Gyeonggi-do, and thus, the content reproduction apparatus 400 needs to determine in which province the particular Gwangju desired by the user is located. In an embodiment, the content reproduction apparatus 400 may search for a region desired by the user by using an artificial intelligence model. The content reproduction apparatus 400 may output weather in a region expected to be desired by the user as a result by using various pieces of information such as where the user is currently located, which region the user prefers, or which region weather is searched more between Gwangju, Jeolla-do and Gwangju, Gyeonggi-do. For example, when the user is located in Suwon, Gyeonggi-do, the weather of Gwangju, Gyeonggi-do, which is closer to the user's current location, may be output. Alternatively, even though the user's current location is not in Gyeonggi-do, when the user has a history of previously searching for the weather in Gwangju, Gyeonggi-do several times, the content reproduction apparatus 400 may also output the weather in Gwangju, Gyeonggi-do this time by using the user's history of use.

The first screen 720 may include weather information requested by the user and may also include objects 721 and 723 selectable by the user. In FIG. 7, the object 721 included in the first screen 720 may be a voice assistant service activation indication. The voice assistant service activation indication may be an indication indicating that the voice assistant service of the content reproduction apparatus 400 is activated.

When the user selects the object 721, the content reproduction apparatus 400 may terminate the voice assistant service which has already been activated, or when the user desires a new control command, the content reproduction apparatus 400 may perform a function corresponding to the object, such as outputting an utterance word that the user may utter.

When the user desires to know information output on the first screen 720 in more detail, the other object 723 included in the first screen 720 may be selected. When the user selects the object 723, the content reproduction apparatus 400 may output the weather in Gwangju in more detail. For example, the content reproduction apparatus 400 may output information such as weather in Gwangju for a week, a temperature change for each hour of the day, and the like.

In an embodiment, when the user does not select one of the objects 721 and 723 included in the first screen 720, the content reproduction apparatus 400 may determine whether a certain time elapses after the first screen 720 is output. When the user does not select an object for a certain time, the content reproduction apparatus 400 may determine which object a focus 722 is located on. When an object on which the focus 722 is located among the objects of the first screen 720 is a voice assistant service activation indication, the content reproduction apparatus 400 may determine that it is difficult for the user to use the voice assistant service, and may output guide information for facilitating a user's selection.

In FIG. 7, as an example of the guide information, one of first guide information 730 or second guide information 740 may be output on a screen or output as an utterance.

The first guide information 730 may be descriptive information about content that the content reproduction apparatus 400 comprehends as a control command of the user, such as "I informed you about the weather in Gwangju, Gyeonggi-do. You can see more details by pressing the key below".

The second guide information 740 may include utterance word information that the user may request when the user wants to request other information, such as "I informed you about the weather in Gwangju, Gyeonggi-do. If you want to see weather in Gwangju, Jeolla-do, please ask me, 'How is the weather in Gwangju, Jeolla-do?'". The utterance word information included in the second guide information 740 may further include information indicating that the utterance word information is an utterance command that may be a control command when the utterance word information is uttered. For example, when the second guide information 740 is output as an utterance, the second guide information 740 includes information "Please ask me, ~", and thus, the user may determine that an utterance after the utterance "Please ask me~" may be uttered by using the information "Please ask me~". Also, when the second guide information 740 is output as text on the screen, the user may determine what kind of utterance word may be uttered by reading the text. Alternatively, because the text 'How is the weather in Gwangju, Gyeonggi-do?' is written in single quotation marks, the user may determine that the utterance words written in single quotation marks may be uttered by using the text in the single quotation marks. Alternatively, a logo indicating that an utterance command may be performed may be displayed next to an utterance word that may be uttered. In an embodiment, the utterance words 'How is the weather in Gwangju, Gyeonggi-do?' may be written in a unique font or color. The user may recognize a control command that may be uttered, by using various pieces of information.

Figure 8:
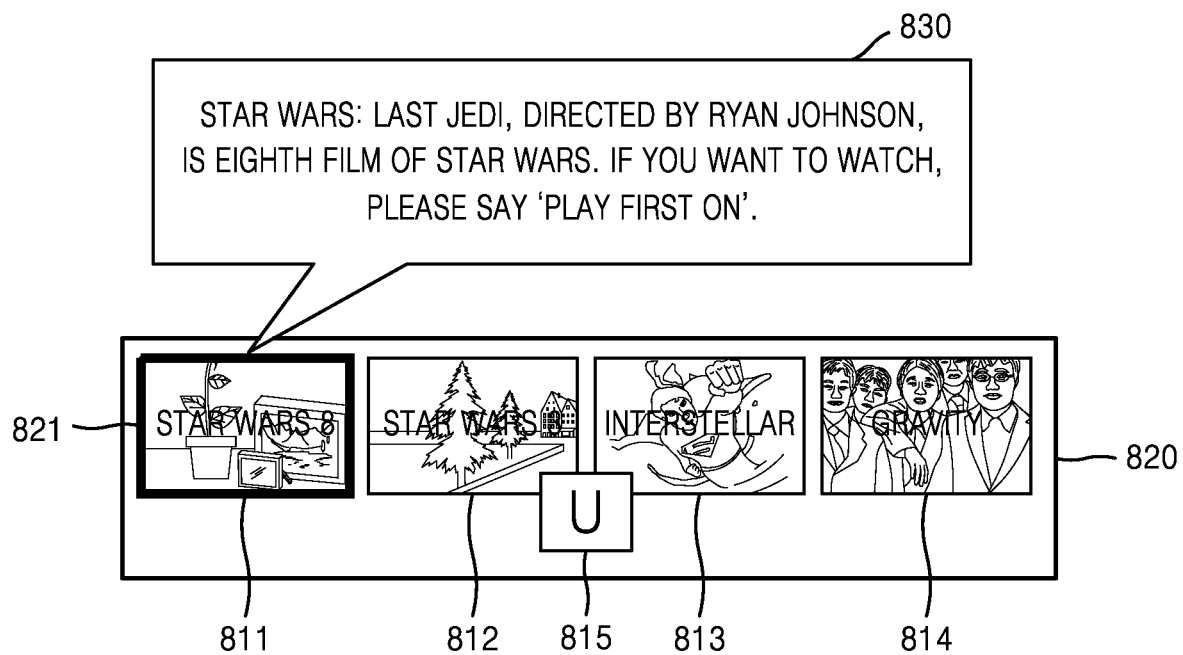
FIG. 8 is a diagram of guide information provided to a user according to an object on which a focus is placed, according to an embodiment.

FIG. 8 is a diagram of guide information provided to a user according to an object on which a focus is located, according to an embodiment.

Referring to FIG. 8, the content reproduction apparatus 400 may output a first screen 810. The first screen 810 may be generated to correspond to a control command requested by the user. For example, the user may input a control command to watch a science-fiction (SF) movie to the content reproduction apparatus 400. The user may generate a control command such as "Show me popular SF movies" by utterance and input the control command to the content reproduction apparatus 400. Alternatively, the user may sequentially select objects output on a screen by using the control device 600 such as a remote controller, etc. and thus may cause the first screen 810 to be output. For example, the user may select "View movies" on the screen by using a control device and select "SF movies", which are a desired genre, from among the objects, and may cause the content reproduction apparatus 400 to output the first screen 810.

Alternatively, the first screen 810 may be a screen that is automatically generated, and may output when the content reproduction apparatus 400 is turned on.

The first screen 810 includes objects 811, 812, 813, 814, and 815 selectable by the user. When the user does not select one of the objects 811, 812, 813, 814, and 815 included in the first screen 810, the content reproduction apparatus 400 may generate guide information for helping the user to select.

In order to generate the guide information, the content reproduction apparatus 400 may determine which one of the objects 811, 812, 813, 814, and 815 included in the first screen 810 a focus is located on.

In an embodiment, when the object 811 on which a focus 816 is located is one content, the content reproduction apparatus 400 may output, as guide information, information about the content on which the focus 816 is located. In FIG. 8, guide information 830 may be descriptive information about the content on which the focus 816 is located. That is, the guide information 830 may include descriptive information about the content on which the focus 816 is located, such as "Star Wars: The Last Jedi, directed by Ryan Johnson, is the eighth film of Star Wars". Also, the guide information 830 may provide a guide about what the user needs to do to select content, such as "If you want to watch, please say 'Play the first one'". The user may easily select desired content by utterance by uttering "Play the first one" or "Play the second one" according to the guide information 830.

Figure 9:
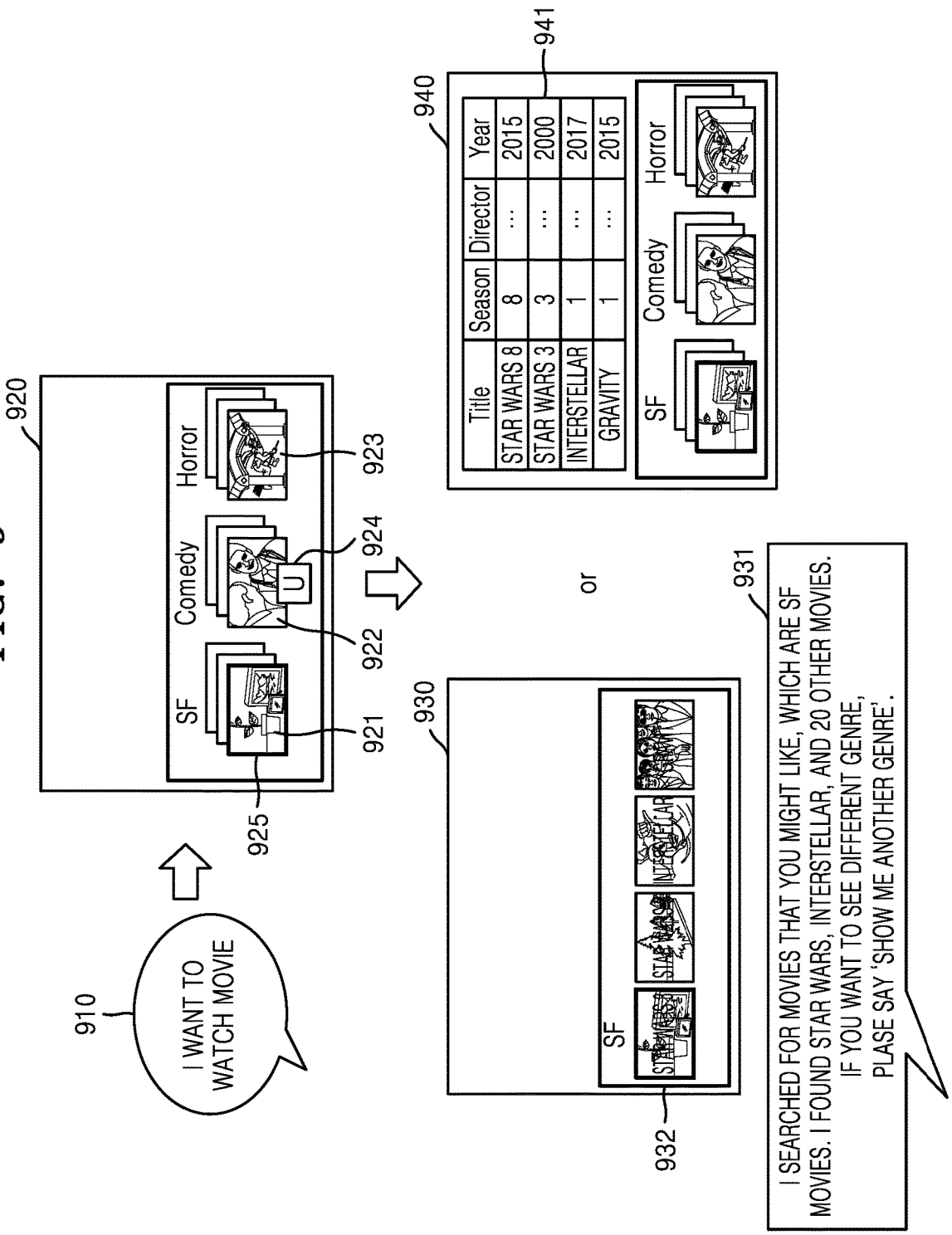
FIG. 9 is a diagram of guide information provided to a user according to an object on which a focus is placed, according to an embodiment.

FIG. 9 is a diagram of guide information provided to a user according to an object on which a focus is located, according to an embodiment.

Referring to FIG. 9, the user may transmit a control command in the form of utterance to the content reproduction apparatus 400 by uttering "I want to watch a movie" 910 by using the voice assistant service. The voice assistant service may have already been activated, or the content reproduction apparatus 400 may activate the voice assistant service through utterance of the user.

The content reproduction apparatus 400 may output a first screen 920 in response to the control command of the user. The first screen 920 is generated in response to the control command requested by the user, and in FIG. 9, the first screen 920 includes movies grouped by each genre. That is, SF movies 921, comedy movies 922, and horror movies 923 are grouped and included in the first screen 920, respectively. Also, the first screen 920 includes a voice assistant service activation indication 924. The user may select one of the objects 921, 922, 923, and 924. When the user selects a particular object, the content reproduction apparatus 400 may output information corresponding to the object selected by the user.

In an embodiment, when the user does not select any one of the objects 921, 922, 923, and 924, the content reproduction apparatus 400 may generate guide information corresponding to an object on which a focus 925 is located and output screens 930 and 940 including guide information.

Because the focus 925 is located on an object of the SF movies 921, the content reproduction apparatus 400 may output guide information 931 including common information about a plurality of pieces of SF movie content. In FIG. 9, the guide information 931, that is, "I searched for movies that you might like, which are SF movies. I found Star Wars, Interstellar, and 20 other movies. If you want to see a different genre, please say 'Show me another genre'", may be output as text on a screen or may be output by utterance. By using the guide information 931, the user may easily identify at a glance what kind of SF movies there are.

In an embodiment, a screen 932 on which a plurality of pieces of content are spread out may be output as guide information. In this case, even when the user does not select the object of the SF movies 921, the content reproduction apparatus 400 may list and display objects belonging to a group on which the focus 925 is located, and thus, the user may easily check a result.

In an embodiment, guide information 941 may include information about the objects belonging to the group on which the focus 925 is located in the form of a list. In FIG. 9, the guide information 941 may include information about each movie included in a group of the SF movies 921. The user may be able to easily identify or select desired content by using the guide information 941.

Figure 10:
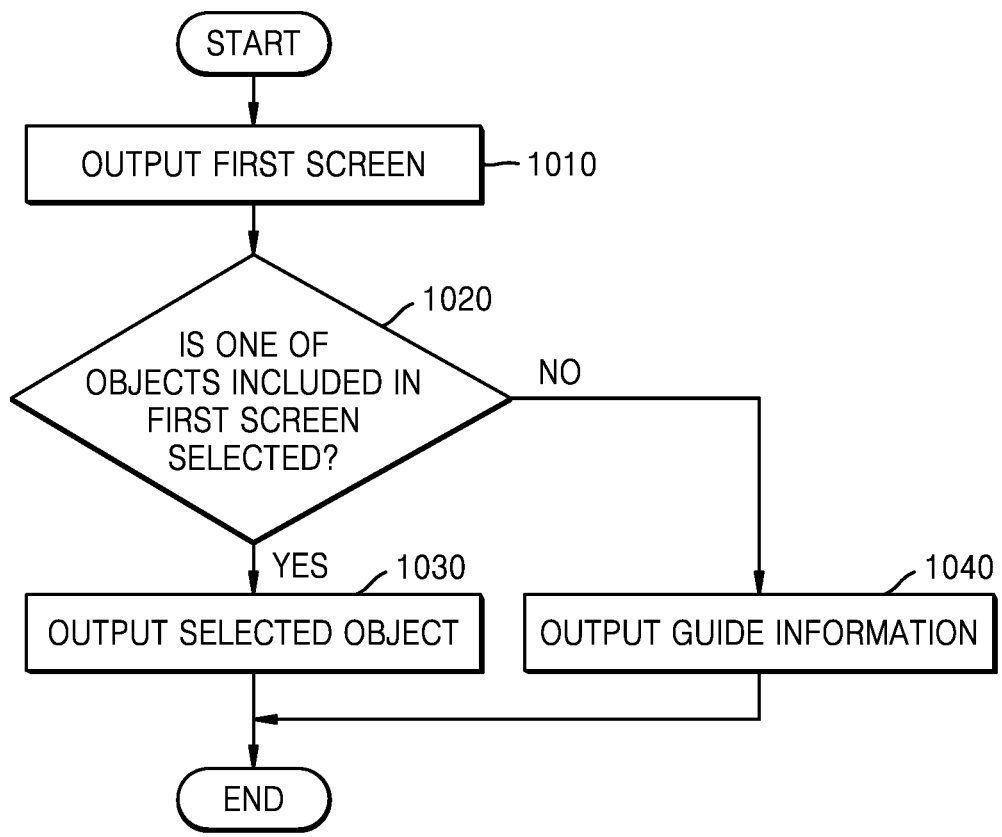
FIG. 10 is a flowchart of a method of providing guide information, according to an embodiment.

FIG. 10 is a flowchart of a method of providing guide information, according to an embodiment. Referring to FIG. 10, the content reproduction apparatus 400 outputs a first screen (operation 1010). The first screen may be a screen corresponding to a result requested by a user, but is not limited thereto. When the first screen includes one or more selectable objects, the user may select one of the objects. When the content reproduction apparatus 400 determines that the user has selected one of the objects included in the first screen (operation 1020), the content reproduction apparatus 400 may output the objected selected by the user in more detail (operation 1030).

In an embodiment, the user may not select one of the objects included in the first screen. When the content reproduction apparatus 400 determines that the user has not selected one of the objects included in the first screen (operation 1020), the content reproduction apparatus 400 may output guide information for a user selection (operation 1040).

The guide information may be output in the form of an utterance and/or a screen. Also, the guide information may include utterance word information used to select one or more objects.

Figure 11:
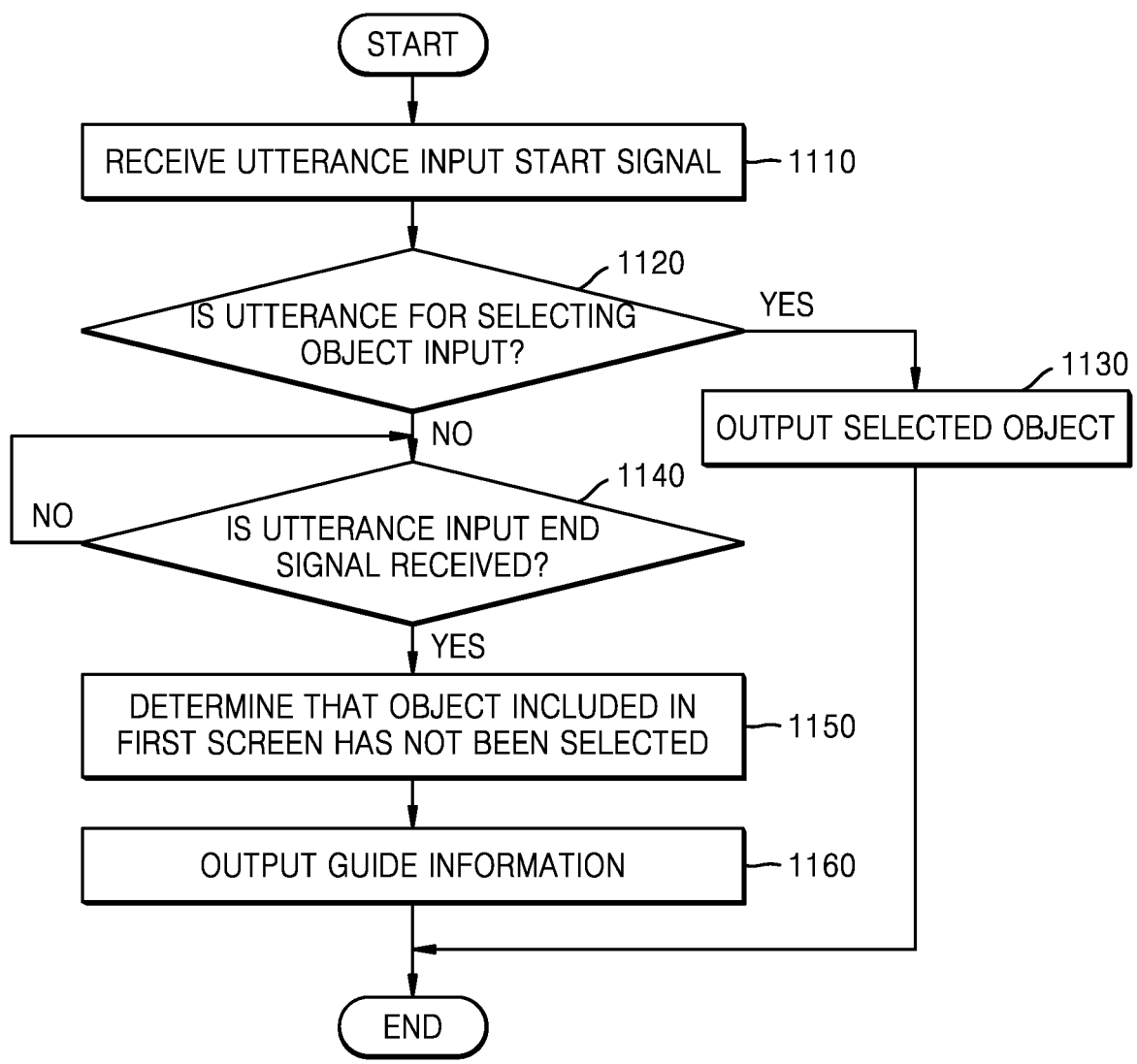
FIG. 11 is a flowchart of a method of providing guide information, according to an embodiment.

FIG. 11 is a flowchart of a method of providing guide information, according to an embodiment. Referring to FIG. 11, the content reproduction apparatus 400 may receive an utterance input start signal from a user (operation 1110). The user may generate the utterance input start signal by inputting a voice assistant service provision key provided in the control device 600. Alternatively, the user may generate the utterance input start signal by uttering a preset utterance such as "Hi Bixby".

The content reproduction apparatus 400 determines whether an utterance for selecting an object is received from the user (operation 1120). When the user inputs the utterance for selecting an object, the content reproduction apparatus 400 may output an object selected by the user (operation 1130). When the user does not input the utterance for selecting an object, the content reproduction apparatus 400 may determine whether an utterance input end signal is received (operation 1140). The utterance input end signal may be generated, for example, when the user utters a preset utterance such as "Goodbye Bixby", when the user inputs the voice assistant service provision key provided in the control device 600 once again, or when the user releases pressing to an original state without any utterance while pressing the voice assistant service provision key, but is not limited thereto. When an utterance end signal is received from the user, the content reproduction apparatus 400 may determine that an object included in the first screen has not been selected (operation 1150) and output guide information to the user (operation 1160).

A content reproduction apparatus and an operating method thereof according to some embodiments may also be implemented as a recording medium including instructions executable by a computer such as a program module. A computer-readable medium may be an arbitrary available medium accessible by a computer, and examples thereof include all volatile and non-volatile media and separable and non-separable media. Also, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. Examples of the communication medium generally include computer-readable instructions, data structures, program modules, other data of modulated data signals such as carrier waves, or other transmission mechanisms, and include arbitrary information transmission media.

Also, the terms "unit" and "-er (-or)" used herein may be a hardware component such as a processor or a circuit and/or a software component executed in a hardware component such as a processor.

Also, according to the aforementioned embodiments of the disclosure, the content reproduction apparatus and the operating method thereof may be implemented as a computer program product including a recording medium having stored therein a program for performing an operation of obtaining a sentence composed of multiple languages, and an operation of obtaining vector values respectively corresponding to words included in the sentence composed of multiple languages by using a multi-language translation model, converting the obtained vector values into vector values corresponding to a target language, and obtaining a sentence composed of the target language based on the converted vector values.

While the disclosure has been particularly shown and described with reference to embodiments thereof, it will be understood by one of ordinary skill in the art that various changes in form and details may be made therein without departing from the spirit and scope of the disclosure as defined by the following claims. Hence, it will be understood that the embodiments should be considered in descriptive sense only and not for purposes of limitation. For example, each component described in a single type may be executed in a distributed manner, and components described distributed may also be executed in an integrated form.

The invention claimed is:

1. A content reproduction apparatus comprising:
an outputter configured to output video and audio;
a user interface configured to receive an utterance from a user;
a memory configured to store one or more instructions; and
a processor configured to execute the one or more instructions stored in the memory, to:
control the outputter to output a first screen in which one or more objects selectable by the user's utterance are included and a focus is displayed with respect to one of the one or more objects, and,
when an utterance for selecting one of the one or more objects included in the first screen is not received from the user through the user interface, control the outputter to output utterable guide information for a next selection based on the object corresponding to the focus displayed.

2. The content reproduction apparatus of claim 1, wherein the processor controls the outputter to output the utterable guide information when the utterance for selecting one of the one or more objects is not received from the user within a predetermined time after the first screen is output.

3. The content reproduction apparatus of claim 1, wherein the processor controls the outputter to output the utterable guide information when the user requests additional information for selecting an object through the user interface.

4. The content reproduction apparatus of claim 1, wherein
an utterance input start signal is received from the user through the user interface, and
the processor controls the outputter to output the utterable guide information when an utterance for selecting one of the one or more objects is not received from the user after the utterance input start signal is received.

5. The content reproduction apparatus of claim 4, wherein the processor controls the outputter to output the utterable guide information when in a state in which the utterance for selecting one of the one or more objects is not received after the utterance input start signal is received, an utterance input end signal is received from the user through the user interface.

6. The content reproduction apparatus of claim 5, wherein
the processor is further configured to execute the one or more instructions to control the user interface to further receive a control command of the user from a control device,
the utterance input start signal is a long-pressed input of a particular key provided in the control device, and the utterance input end signal is a release of the long-pressed input.

7. The content reproduction apparatus of claim 1, wherein
the outputter includes a display and an audio outputter configured to output the utterable guide information in a form of an utterance,
the display is configured to overlay and display a screen indicating the utterable guide information over the first screen, and
the processor is further configured to execute the one or more instructions to control the outputter to cause one or more of the audio outputter and the display to output the utterable guide information.

8. The content reproduction apparatus of claim 7, wherein the utterable guide information includes utterance word information used to select the one or more objects by utterance.

9. The content reproduction apparatus of claim 8, wherein the utterable guide information further includes information indicating that the utterance word information is an utterance command that the user is able to utter and give a control command.

10. The content reproduction apparatus of claim 7, wherein the utterable guide information includes information for selecting one or more of screen movement on the display and volume control of the audio outputter.

11. The content reproduction apparatus of claim 1, wherein the utterable guide information includes one or more of information for selecting the one or more objects and descriptive information about the one or more objects.

12. The content reproduction apparatus of claim 1, wherein the processor is further configured to execute the one or more instructions to cause the outputter to output utterable guide information including one or more of common information about a plurality of pieces of content and an information list about each content included in the plurality of pieces of content, and output the plurality of pieces of content in a spread-out manner.

13. The content reproduction apparatus of claim 1, wherein the utterable guide information includes one or more of descriptive information about the first screen and request information for requesting other information.

14. A content reproduction method comprising:
outputting a first screen in which one or more objects selectable based on a user's utterance, are included and a focus is displayed with respect to one of the one or more objects; and
when an utterance for selecting one of the one or more objects included in the first screen is not received from the user, outputting utterable guide information for a next selection according to the object corresponding to the focus displayed.

15. A computer-readable non-transitory recording medium having recorded thereon a program which when executed by a processor causes the processor to:
output a first screen in which one or more objects selectable by a user's utterance are included and a focus is displayed with respect to one of the one or more objects; and
when an utterance for selecting one of the one or more objects included in the first screen is not received from the user, outputting utterable guide information for a next selection according to the object corresponding to the focus displayed.

* * * * *